June 3, 1969
A. BOTTANI
3,447,865
PORTABLE APPARATUS FOR CONTINUOUS CINEMATOGRAPHIC PROJECTION
OF A FILM CONTAINED IN AN INTERCHANGEABLE CHARGER
Filed June 20, 1966
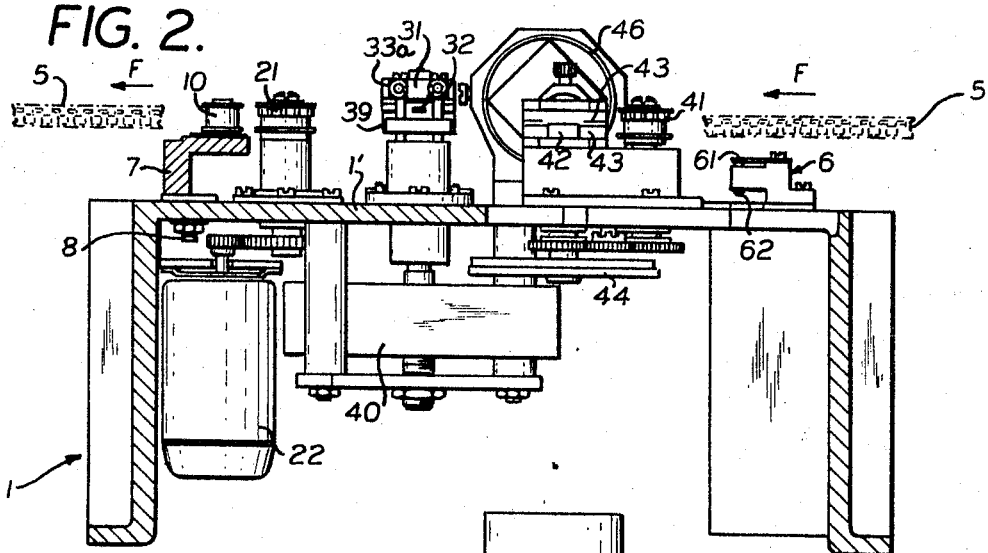
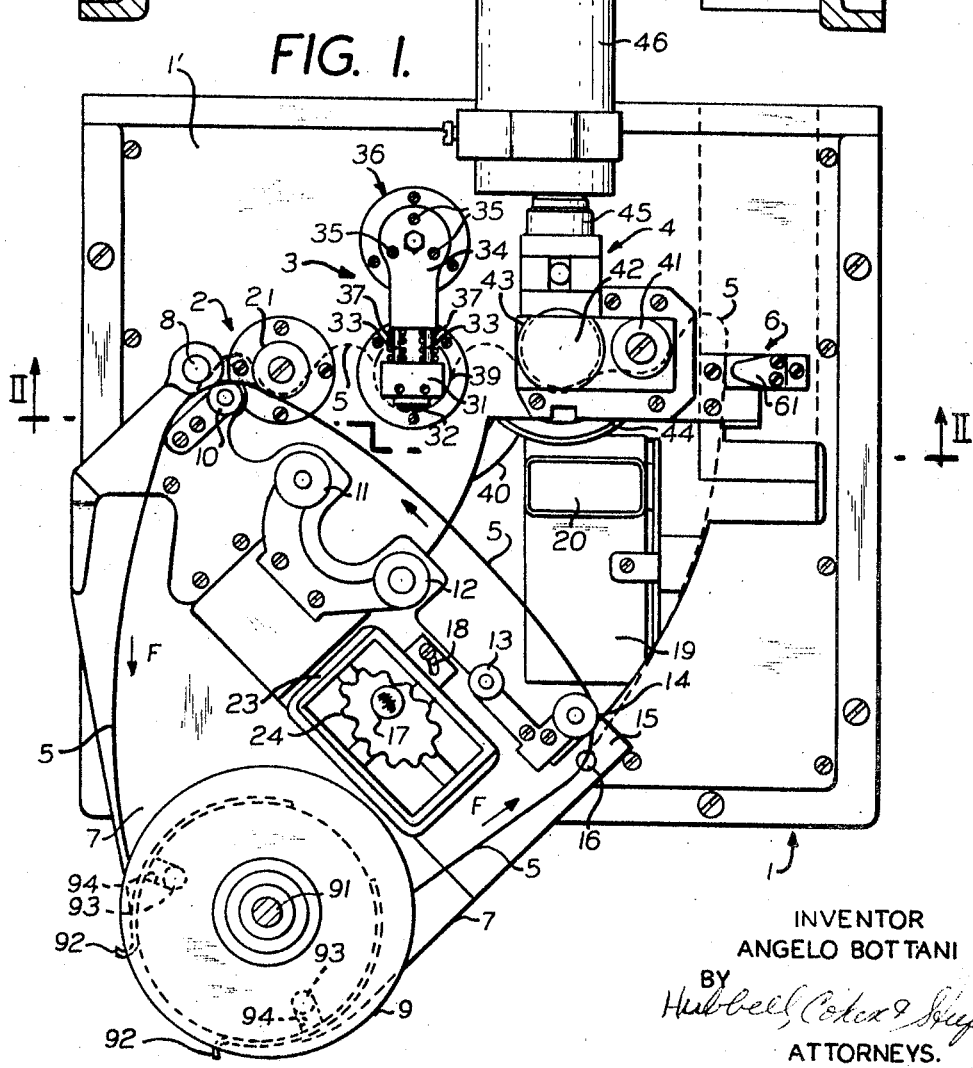
INVENTOR
ANGELO BOTTANI
BY
Hubbell, Cohen & Stiefel
ATTORNEYS.

United States Patent Office 3,447,865
Patented June 3, 1969

3,447,865
PORTABLE APPARATUS FOR CONTINUOUS CINEMATOGRAPHIC PROJECTION OF A FILM CONTAINED IN AN INTERCHANGEABLE CHARGER
Angelo Bottani, Milan, Italy, assignor to Società Internazionale Fonovisione S.p.A., Milan, Italy, a corporation of Italy
Filed June 20, 1966, Ser. No. 558,839
Claims priority, application Italy, June 24, 1965, 14,064/65
Int. Cl. G03b *31/02*
U.S. Cl. 352—27  15 Claims

ABSTRACT OF THE DISCLOSURE

A portable film projector in which the film drive mechanism, the sound reproduction unit and the projection unit are mounted on the base in a fixed position. The device for supporting the film reel is mounted on a pivotable plate and can be rotated away from its operating position so that the film can be changed.

---

The present invention relates to an apparatus for the cinematographic projection of films contained in interchangeable reels or cannisters, particularly of the type in which the film is continuously projected by unwinding and rewinding in a closed loop.

An object of the invention is to provide a new automatic projector of this type which enables the film which is to be projected to be placed in the projection position by means of an automatic operation.

Another object is to provide an apparatus which permits the easy insertion and removal of the film reel without it being necessary to detach its support from the apparatus or to move the cover of the said apparatus.

Another object is to provide an apparatus of very simple construction, low in cost, and of vary small dimensions so that it can be transported easily.

The above and other objects are achieved by suitably constructing and arranging the various parts of the apparatus so that they constitute two separate units, one fixed and the other movable, said units being adapted to cooperate only when the movable unit is in the projection position.

The apparatus of the invention is characterized by the fact that it comprises a base on which there are fixedly mounted a film driving unit, a sound transcription unit, and a projection unit, and a plate rotatably mounted on said base and having mounted thereon a support for the interchangeable film reel, a projection lamp together with its associated condenser lens and film guide rollers. The plate is adapted to assume two end positions, one of which positions is the working position in close proximity to the aforesaid fixed units, in which it holds the film in the projection position. The other end position is a position of rest at a sufficient distance from said fixed units, in which position the reel can be inserted and changed without it being necessary to disengage said plate from the base or to remove the cover from the apparatus.

According to another aspect of the invention the sound reproduction unit of the apparatus comprises a magnetic head biased against the sound track in such a manner that the wear of said head is automatically compensated.

Further objects, features and characteristics of the invention will be more fully understood from the following description taken in connection with the accompanying drawings which illustrate, solely by way of example, a preferred form of construction of the apparatus according to the invention.

In the drawings:

FIG. 1 is a plan view of the apparatus with its parts in the disengaged position, the cover of the apparatus having been lifted off; and FIG. 2 is a sectional view taken along the line II—II of FIGURE 1.

Referring to the drawings, the apparatus comprises a frame 1 which has a flat base 1' on which the various parts are mounted. A driving unit 2, a sound reproduction unit 3, and a film projection unit 4 are each fixedly mounted to base 1' in substantial alignment with each other and with their axes of rotation perpendicular to the base 1'. The driving unit 2 is composed of a sprocket 21 adapted to drive a film 5. A synchronous motor 22 is mounted beneath the base 1' for rotating sprocket 21 through a suitable transmission, as can be seen in FIGURE 2.

In FIGURE 1, the film 5 is shown in broken lines in the position which it assumes during projection and in solid lines in the position which it assumes in the position of rest. The film 5 is also shown in FIGURE 2 for the purpose of indicating its position in relation to the units with which it cooperates. The direction of forward movement of the film is indicated by the arrows F.

The sound reproduction unit 3, which is of the magnetic sound type, comprises a fixed support 36 and a movable support 31 carrying thereon a magnetic head 32. Support 31 is slidably mounted on two pins 33 which extend through holes therein and are parallel to one another and to the plane of the base 1'. Pins 33 are in turn mounted on an arm 34 which is fixed by means of adjusting screws 35 to the fixed support 36. The movable support 31 is biased away from the fixed support 36 by two springs 37 mounted on the pins 33 and interposed between arm 34 and support 31. The movement of support 31 is limited by stops 33a provided on the outer end of pins 33.

The head 32 is supported on the magnetic sound track of the film 5, and the film in turn is supported on a sound drum 39. On the axis of rotation of said drum 39 there is mounted, below the base 1', a stabilizing flywheel 40 to provide maximum uniformity of movement of the film during projection. The magnetic head 32 (and its respective support 31) is movable inside the sound drum, thus making it possible to place the film in the projection position or to remove it from that position without interfering with the head 32.

The presence of the springs 37 ensures that the head 32 will always be in contact with the sound track under practically constant pressure. In this manner automatic compensation for the wear of said head is obtained.

By means of the adjusting screws 35 it is possible to effect the alignment of the magnetic head 32 in relation to the sound track.

The projection unit 4 comprises essentially a sprocket 41 and a rotating prism 42. During projection, the sprocket 41 engages the film and is caused to rotate by the film, while, in turn, sprocket 41 rotates the prism 42 through a suitable transmission, which can be seen in FIGURE 2.

The prism rotates in synchronism with and in the same direction as the movement of the film, which film, when passing in front of the prism 42, bears against two side guides or slides 43. Beneath the base there is mounted, on the axis of rotation of the prism, an inertia flywheel 44 for promoting uniformity of rotation of the prism in order to obtain a stationary image during projection. At the projection side of the prism 42 there is disposed an objective 45, which by means of an Amici prism 46 (FIGURE 2) projects the images, straightened by said prism 46, onto a screen, not shown, which screen may form part of the apparatus or be separate and at a distance from the latter. Mounted on the base 1' alongside the sprocket 41 is a stop device 6 which serves to hold the movable portion of the apparatus once it is placed in the working or projection position. As will be explained hereinafter, all of the elements of the movable portion are mounted on a movable plate 7. Stop device 6 comprises a plate spring 61 provided with a pin 62 (FIGURE 2) adapted to be received in a cavity or recess 16 provided in an extension 15 on said movable plate 7 which is rotatable about a pin 8 mounted perpendicularly on the base 1'. The plate 7 is adapted to rock or rotate about pin 8 between two end positions about 180° apart, one being the position of rest in which the various parts are sufficiently distant from the fixed units 2, 3, and 4, while the other is the working or projection position (not illustrated) in which said plate is near said units and cooperates with the latter in order to bring the film 5 into the projection position illustrated in broken lines in FIGURE 1. In FIGURE 1 the plate 7 is shown in a position of rest but not rotated to the maximum 180° away from the working or projection position. Guide and positioning rollers 10, 11, 12, 13, and 14 are mounted on the plate 7 for guiding the film 5. A pin 91 is mounted on the plate 7. An interchangeable reel or cannister 9, on which is carried the wound film 5, is rotatably mounted on pin 91 and is secured in position by two retaining springs 92 which are provided with pins 93 adapted to be received in recesses 94 provided in said reel 9. In order to insert and remove a reel it is necessary to move said springs apart so as to disengage the pins 93 from the recesses 94. The film 5, which is wound and unwound in a closed loop, in the position of rest illustrated in FIGURE 1, is held only by the end rollers 10 and 14 which together with the other internal rollers 11, 12 and 13 are disposed on the side of the plate 7 which cooperates with the fixed units. The rollers 10, 11, 12, 13 and 14 are disposed substantially in alignment with each other and rotate about axes perpendicular to the base 1'. These rollers and the base units are, in the projection position, in alignment with each other and with the rotational pin 8.

In the projection phase the rollers 11 and 12 serve to bring the film 5 against the drum 39, and in addition the roller 11 cooperates with the roller 10 to hold the film 5 engaged on the driving sprocket 21, while the roller 12 cooperates with the roller 13 to hold the film 5 on the lateral guide slides 43 of the prism 42, and said roller 13 cooperates with the outer roller 14 to secure the engagement of the film 5 with the sprocket 41. Also mounted on plate 7 is a projection lamp 17 and an associated condenser lens 18.

In order to ensure efficient cooling, a ventilation unit 19 is fastened on the base 1' and is adapted to deliver cooling air to the lamp 17 through an aperture 20 in base 1' which opening is situated beneath lamp 17 when the plate is in the working position. In order to increase the dissipation of heat, the lamp is surrounded by a finned surface 23, which is separated from the lamp by means of a corrugated collar 24 of suitable heat resistant material, which serves the purpose of preventing excessive heating of the surface 23.

The apparatus operates in the following manner. It will be assumed that it is desired to project a film and that the desired reel has been selected. For the purpose of inserting this reel on the plate 7, the latter is turned into its outer position or position of rest in which it is at a distance from the fixed units on base 1' (see FIGURE 1) and a reel 9 is mounted on the pin 91 while the retaining springs 92 are held apart, the release of said springs having the effect of locking the reel 9 onto the plate 7. The fitting of the reel is completed by passing the length of film outside the reel in a loop around the outer rollers 10, 14 on the plate.

The plate 7 is then rotated towards the fixed units to bring it into the projection position (see film 5 shown in broken lines in FIGURE 1). The plate is held in this projection position by the locking device 6. The apparatus is then put into operation and the driving roller 21 commences the movement of the film for projection purposes. Projection is effected continuously and may last indefinitely because the film is unwound from, and rewound into, the reel in a closed loop, and once the projection cycle has been completed said cycle may be repeated indefinitely until the projector is stopped. On completion of the projection the plate 7 is rotated to the outer position of rest, in which position another reel may be inserted to replace the previous reel.

From the above description the advantages of the apparatus of the present invention become apparent. The arrangement of the various parts, as illustrated, makes it possible to bring the film automatically into the projection position. As seen, upon rotation of plate 7 towards the fixed units 2, 3, and 4, so that extension 15 is held by stop device 6, the film is automatically brought into the projection position. In addition, the fitting and replacement of the reel 9 are very practical and simple, as it is not necessary to raise the cover of the apparatus or to disengage the plate carrying the reel from the base. The simple rotation of the plate 7 to the outer position makes it possible to bring the reel and the other parts into a convenient position for the operations of insertion, removal, inspection and so on.

A preferred form of construction of the apparatus has been described solely by way of example, but it is obvious that variations and modifications may be made therein without thereby departing from the spirit and scope of the invention. Thus, for example, it is possible to eliminate the sprocket 41, and its duties may be performed by one of the side slides of the prism, which in that case will be provided with teeth to engage the film and will be connected kinematically to the prism 42 in order to drive it in rotation at the same angular speed.

What I claim is:

1. A portable apparatus for continuous cinematographic projection of a film carried on an interchangeable reel, which apparatus comprises a base, a film driving unit fixedly mounted to said base, a sound reproduction unit fixedly mounted to said base, a projection unit fixedly mounted to said base, a plate rotatably mounted on said base, said plate having mounted thereon means for removably mounting an interchangeable reel of film thereon, a projection lamp and associated condenser lens, and a plurality of film guide and positioning rollers, said plate being rotatable between a projection position in proximity to said units fixed to said base, for bringing said rollers into cooperative association with said fixed units to hold the film in proper projection position, and a rest position spaced from said fixed units for permitting replacement of the reel of film.

2. Apparatus according to claim 1 wherein said film driving unit comprises a sprocket and a motor mounted to said base for rotating said sprocket.

3. Apparatus according to claim 1 wherein said sound reproduction unit is of the magnetic type and comprises a magnetic head and means for yieldably biasing said head against the sound track of the film.

4. Apparatus according to claim 3 wherein said sound reproduction unit further comprises a fixed support, an arm adjustably mounted on said support, guide pins mounted on said arm, a movable support slidably mounted on said pins, said magnetic head being mounted on said movable support, springs mounted on said pins for biasing said movable support and said magnetic head away from said fixed support and against said sound track, and stop means carried by said pins for limiting the displacement of said movable support away from said fixed support.

5. Apparatus according to claim 4, further comprising a sound drum, said magnetic head and said movable support being biased towards the interior surface of said sound drum, said interior surface of said sound drum being adapted to support said film during the projection thereof.

6. Apparatus according to claim 5, further comprising a stabilizing flywheel mounted beneath the base, on the rotational axis of the sound drum, for rotating said drum at a uniform speed.

7. Apparatus according to claim 4 wherein said adjustable arm is movable in a plane parallel to the plane of said film for adjusting the alignment of the magnetic head on the sound track.

8. Apparatus according to claim 1 wherein said projection unit comprises a rotating prism, an associated objective, a sprocket for rotating the prism in synchronism with the film, said sprocket being in turn driven by the film, and a pair of lateral slides for guiding said film across the front of said prism.

9. Apparatus according to claim 8, further comprising a stabilizing flywheel mounted beneath the base on the rotational axis of the prism for promoting rotation of said prism at a uniform speed.

10. Apparatus according to claim 1 wherein said rotatable plate is rotatably mounted on a rotational pin fixed to said base, the axis of said pin being perpendicular to said base.

11. Apparatus according to claim 1 wherein said means for removably mounting said film reel on said plate comprises a pin mounted perpendicular to said plate and a pair of retaining springs mounted on the plate, said retaining springs having pins thereon adapted to be received in corresponding recesses provided on said reel, for securing said reel to said plate.

12. Apparatus according to claim 1, further comprising means for securing said plate to said base when said plate is in the projection position.

13. Apparatus according to claim 1, further comprising a cooling unit mounted to said base for supplying a current of cooling air to said lamp, said base having an aperture therein for directing said current of cooling air to said lamp.

14. Apparatus according to claim 13, further comprising a corrugated collar of suitable heat resistant material surrounding said projection lamp, said collar being in turn surrounded by a finned surface for further dispersing heat generated by said lamp.

15. Apparatus according to claim 10 wherein said base units and said rollers on said plate are substantially in alignment with one another and with said rotational pin when said plate is in the projection position, the axes of rotation of said base units, of the rollers, and of the pin being perpendicular to the base.

References Cited

UNITED STATES PATENTS 3,330,493  7/1967  Seeley et al. _____ 352—34

NORTON ANSHER, *Primary Examiner.*

U.S. Cl. X.R.

242—55.11; 352—157